(12) United States Patent
Wessel et al.

(10) Patent No.: US 8,186,916 B2
(45) Date of Patent: May 29, 2012

(54) SYSTEM AND METHOD FOR TRANSPORTING WIND TURBINE TOWER SECTIONS ON A SHIPPING VESSEL

(75) Inventors: Thomas Wessel, Rheine (DE); Peter Scott, Georgsmarienhutte (DE)

(73) Assignee: General Electric Company, Schenectady, NY (US)

( * ) Notice: Subject to any disclaimer, the term of this patent is extended or adjusted under 35 U.S.C. 154(b) by 266 days.

(21) Appl. No.: 12/135,992

(22) Filed: Jun. 9, 2008

(65) Prior Publication Data
US 2009/0304475 A1 Dec. 10, 2009

(51) Int. Cl.
*B60P 7/12* (2006.01)
*B60P 1/00* (2006.01)
(52) U.S. Cl. .......................................................... 410/44
(58) Field of Classification Search .................. 410/101, 410/44, 45, 46, 47, 32, 33, 34, 35, 53, 82, 410/77; *B60P 1/00, 7/12*
See application file for complete search history.

(56) References Cited

U.S. PATENT DOCUMENTS

| | | | |
|---|---|---|---|
| 5,579,698 A * | 12/1996 | Lis et al. .......................... 105/364 |
| 6,390,742 B1 * | 5/2002 | Breeden ............................ 410/77 |
| 6,522,025 B2 * | 2/2003 | Willis et al. ..................... 290/55 |
| 6,983,844 B2 | 1/2006 | O'Kane et al. |
| 7,075,189 B2 | 7/2006 | Heronemus et al. |
| 7,210,882 B2 * | 5/2007 | Andersen et al. ............... 410/82 |
| 7,234,409 B2 | 6/2007 | Hansen |
| 7,244,084 B2 * | 7/2007 | Anthony et al. ................ 410/49 |
| 7,690,875 B2 * | 4/2010 | Grabau ........................... 410/45 |
| 7,942,601 B2 * | 5/2011 | Bohman et al. ............... 403/343 |
| 2002/0009346 A1 | 1/2002 | Holt et al. |
| 2004/0217037 A1 | 11/2004 | O'Kane et al. |
| 2004/0262926 A1 | 12/2004 | Hansen |
| 2005/0002749 A1 | 1/2005 | Andersen et al. |
| 2006/0251517 A1 | 11/2006 | Grabau |
| 2007/0102940 A1 | 5/2007 | Hansen |
| 2007/0145181 A1 | 6/2007 | Pedersen |
| 2007/0177955 A1 * | 8/2007 | Heuvel et al. .................. 410/44 |

FOREIGN PATENT DOCUMENTS
GB 2029777 A 3/1980
WO 02083523 A1 10/2002

OTHER PUBLICATIONS

European Search Report; Application No. 09161632.6-1267/2133558; dated Jan. 11, 2012; p. 7.

* cited by examiner

*Primary Examiner* — Glenn Dayoan
*Assistant Examiner* — Sunsurraye Westbrook
(74) *Attorney, Agent, or Firm* — James McGinness, Esq.; Armstrong Teasdale LLP

(57) ABSTRACT

In a system and method for transporting wind turbine tower sections on a shipping vessel a pair of support members is secured to a first wind turbine tower section generally at opposite ends of the first tower section. Another pair of support members is secured to a second wind turbine tower section generally at opposite ends of the second tower section. A pair of elongate mounting members is secured on a support surface of the shipping vessel in spaced relationship with each other. One of the support members of the first tower section and one of the support members of the second tower section are secured to one of the elongate mounting members. The other one of the support members of the first tower section and the other one of the support members of the second tower section are secured to the other one of the elongate mounting members.

22 Claims, 6 Drawing Sheets

SYSTEM AND METHOD FOR TRANSPORTING WIND TURBINE TOWER SECTIONS ON A SHIPPING VESSEL

FIELD

This field of endeavor relates generally to systems and methods for transporting wind turbine tower sections, and more particularly to such systems and methods for shipping wind turbine tower sections on a shipping vessel.

BACKGROUND OF INVENTION

Wind turbines are increasingly used for the generation of electrical energy. A wind turbine typically comprises a rotor-driven turbine generator mounted atop a tower constructed of multiple tower sections that are stacked and secured together. It is common for wind turbine components such as the tower sections to be transported on shipping vessels to their desired destinations.

Certain cargo shipping vessels have weather decks that are equipped with accessible locking mechanisms such as conventionally known semi-automatic twist-lock mechanisms for releasably securing conventional cargo containers (e.g., rectangular, box-shapes cargo containers) to the weather decks. The cargo containers have corresponding locking mechanisms at their bottom corners for mating with the locking mechanisms on the deck, and at their top corners to lock together stacked cargo containers. The ship's locking mechanisms are thus spaced across the width of the deck and located intermittently longitudinally of the deck.

For shipping purposes, wind turbine tower sections—which are typically cylindrical or frusto-conical—are fitted at both ends with a support member having a bottom that defines a pair of spaced apart feet or a straight, flat surface for stably resting the tower section on the ship's deck and for preventing the tower section from rolling. Additional locking mechanisms may be located at the top of the support member to permit stacking (in side-by-side relationship) of tower sections in the same manner as a cargo container.

The support frames at the ends of the tower sections are often welded to the deck because the spacing of locking mechanisms across the width of the deck is not standard among ships because tower sections come in different cross-sectional dimensions (e.g., diameters). Additionally, the wind turbine tower sections are typically larger (e.g., in diameter) than cargo containers, making it difficult to align the feet of the support members with the ship's locking mechanisms. The welding takes place during loading and unloading of the sections. This welding and unwelding, however, is time-consuming and expensive.

Additionally, some shipping vessels that are used to transport wind turbine tower sections have decks or floors with a maximum pressure rating of 2.5 metric tons per square meter. As larger and larger wind turbine tower sections are being used and transported, the weight of the sections that are transported on shipping vessels is increasing and the pressure they exert on the decks and floors of shipping vessels is increasing. While it would be desirable to increase the number of tower sections that can be loaded across the width of the ship's weather deck, it is important to heed the load limits of the deck. There is a need, therefore, for a system and/or method of shipping wind turbine tower sections that permits an increased number of tower sections to be transported on a shipping vessel.

SUMMARY

In one aspect, a system for transporting wind turbine tower sections on a shipping vessel having a plurality of locking components thereon generally comprises a support member securable to a wind turbine tower section and an elongate mounting member. The support member has at least two locking components. The elongate mounting member has a first set of locking components located on the mounting member that releasably secures the mounting member on the shipping vessel and a second set of locking components separate from the first set of locking components that releasably secures the wind turbine tower section to the mounting member.

In another aspect, a system for transporting at least a first wind turbine tower section and a second wind turbine tower section on a shipping vessel generally comprises a first support member that is securable to the first wind turbine tower section, a second support member that is separate from the first support member and securable to the second wind turbine tower section and an elongate mounting member securable to the shipping vessel. The first support member and the second support member are securable to the mounting member in a generally side-by-side spaced relationship with each other.

In one embodiment of a method of transporting wind turbine tower sections on a shipping vessel, a pair of support members is secured to a first wind turbine tower section generally at opposite ends of the first tower section. Another pair of support members is secured to a second wind turbine tower section generally at opposite ends of the second tower section. A pair of elongate mounting members is secured on a support surface of the shipping vessel in spaced relationship with each other. One of the support members of the first tower section and one of the support members of the second tower section are secured to one of the elongate mounting members. The other one of the support members of the first tower section and the other one of the support members of the second tower section are secured to the other one of the elongate mounting members.

BRIEF DESCRIPTION OF THE DRAWINGS

Corresponding reference characters indicate corresponding parts throughout the drawings.

DETAILED DESCRIPTION

Figure 1:
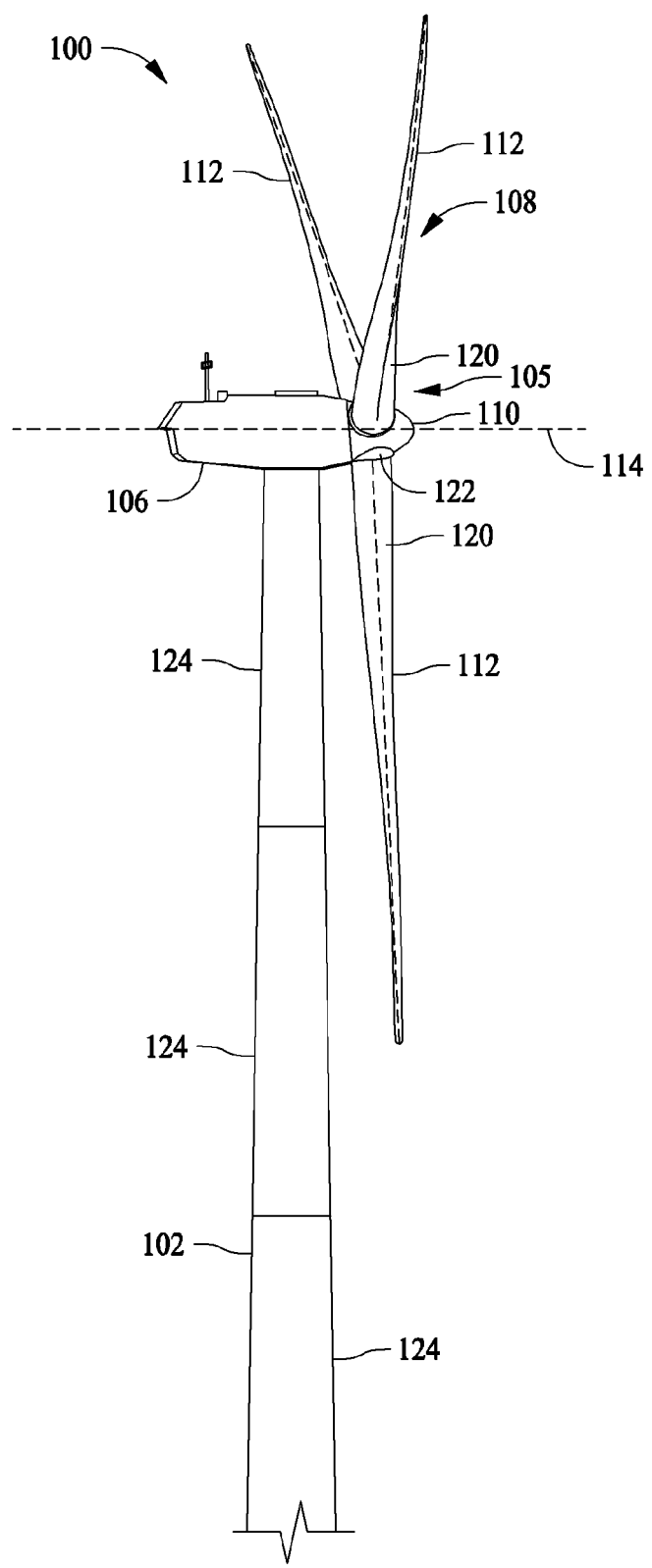
FIG. 1 is a schematic side elevation of a wind turbine tower comprising multiple tower sections.

With reference now to the drawings and in particular to FIG. 1, a wind turbine tower is generally indicated at 100. In the exemplary embodiment, wind turbine tower 100 comprises a horizontal axis 114 wind turbine. Alternatively, wind turbine tower 100 may comprise a vertical axis wind turbine. Wind turbine tower 100 generally comprises a tower 102 standing upright on a suitable foundation (e.g., a concrete slab, ground surface or other suitable foundation—not shown), and a wind turbine generator, generally indicated at 105. Wind turbine generator 105 generally comprises a nacelle 106 mounted on tower 102, and a rotor 108 coupled to nacelle 106. Rotor 108 has a rotatable hub 110 and a plurality of rotor blades 112 coupled to hub 110. Illustrated rotor 108 suitably comprises three rotor blades 112. Alternatively, rotor 108 may have more or less than three rotor blades 112. Blades 112 are positioned about rotor hub 110 to facilitate rotating rotor 108 to transfer kinetic energy from the wind into usable mechanical energy, and subsequently, electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

Tower 102 is suitably tubular, and in the illustrated embodiment it is annular—having an internal cavity (not shown) extending longitudinally within tower 102 from foundation 104 up to nacelle 106. Tower 102 generally comprises a plurality of individual tower sections 124 that are connectable to each other in a stacked, end-to-end (e.g., one on top of the other) relationship to form tower 102. Tower sections 124 may each be of generally constant transverse cross-sectional dimension (e.g., a constant diameter in the illustrated embodiment in which tower sections 124 are each generally annular), or one or more of tower sections 124 may be frusto-conical, and/or the transverse cross-sectional dimension of one or more of tower sections 124 may be constant but different from that of one or more of the other tower sections—such as in a stepped configuration in which the transverse cross-sectional dimension of each tower section 124 decreases as the sections are stacked toward to the top of tower 102.

Figure 3:
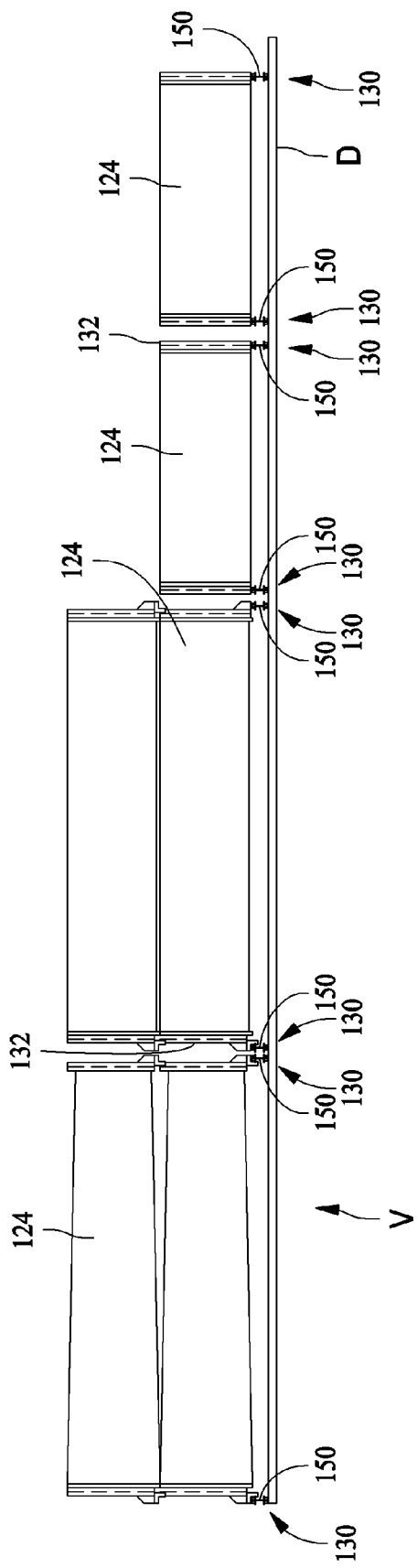
FIG. 3 is a side elevation of multiple tower sections loaded on the weather deck of a cargo shipping vessel using one embodiment of a system for mounting tower sections on a shipping vessel, the portion of the vessel below the deck being omitted.

With reference to FIG. 3, wind turbine tower sections, such as tower sections 124 of wind turbine 100 of the embodiment illustrated in FIG. 1, are illustrated as being loaded onto a weather deck D of a cargo shipping vessel V (only the deck D of which is illustrated in the various figures herein) by one embodiment of a mounting system 130. Mounting System 130 mounts tower sections 124 on a shipping vessel V for transport. It is understood that mounting system 130 may be used for the shipping of tower sections 124 other than those of wind turbine 100 of the FIG. 1 embodiment without departing from the scope of this invention.

Figure 2:
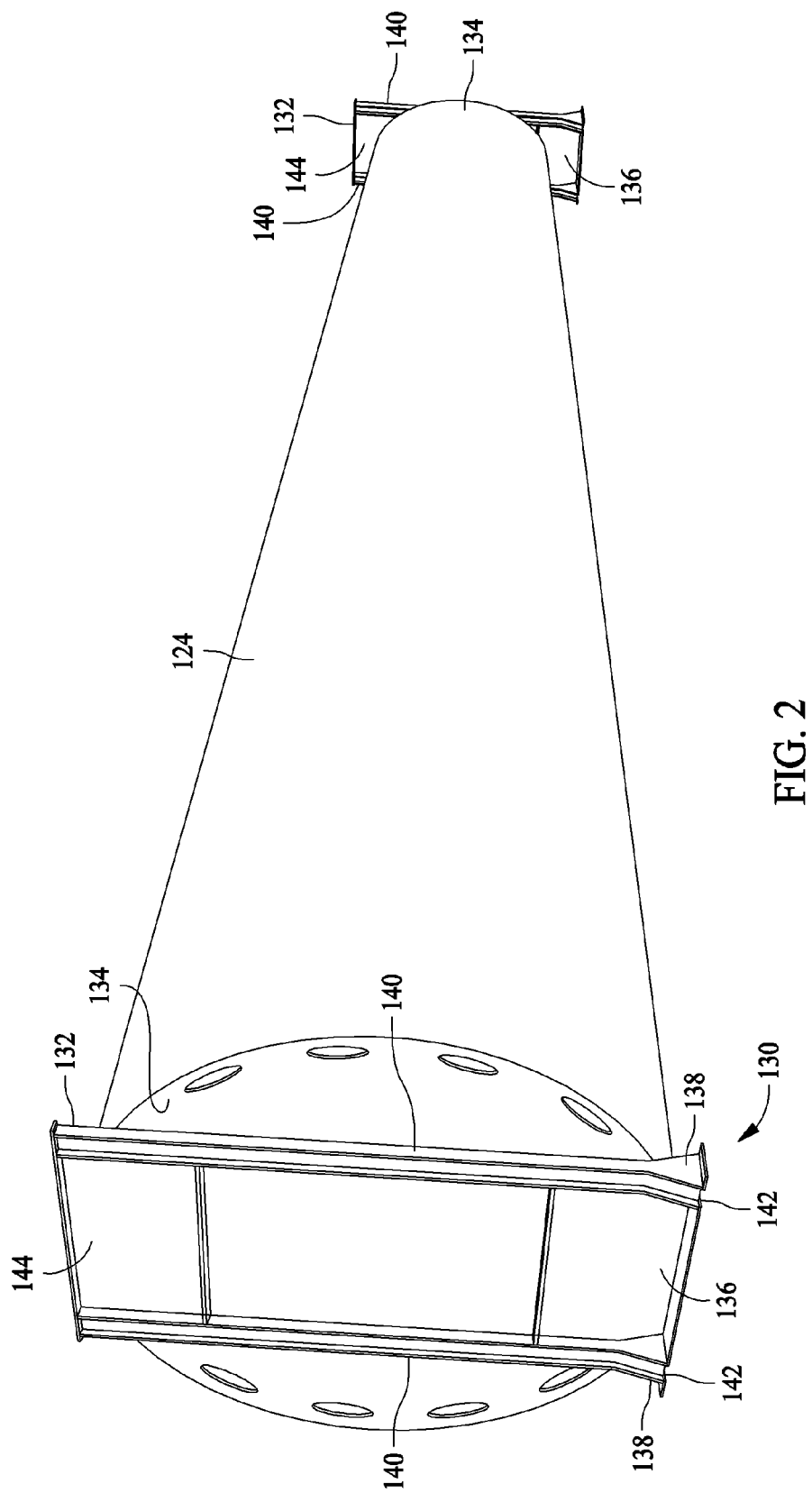
FIG. 2 is a perspective of a tower section of the wind turbine tower with support members secured to each end of the tower section for shipping purposes.

As best seen in FIG. 2, mounting system 130 in one suitable embodiment comprises a pair of support members 132 secured to the respective ends 134 of one tower section 124. The illustrated support members 132 are each shaped generally as a rectangular frame having a top 144, a bottom 136 and transversely opposite sides 140. Alternatively, one or both of the support members 132 may be generally H-shaped, generally A-shaped, and may or may not have one or more openings therethrough (e.g., it may have the general appearance of a solid plate) without departing from the scope of this invention. The support frames 132 are suitably constructed, such as of steel or other suitable material, to support the weight of tower section 124 during transport. In one particularly suitable embodiment, the support frames 132 are removably secured to ends 134 of tower section 124, such as by threaded fasteners (not shown) or other suitable securement devices.

Bottom 136 of each support member 132 includes a pair of feet 138, which as used herein refers to a pair of spaced apart portions along bottom 136 of support member 132 that contact and rest on, and more suitably secure to, deck D of shipping vessel V. In the illustrated embodiment the feet 138 are disposed generally at the transversely spaced corners where bottom 136 and sides 140 intersect. The feet 138 provide a stable foundation for supports members 132 on deck D to inhibit tower section 124 against rolling or other movement relative to deck D. The illustrated support member 132 extends along bottom 136 the entire distance between feet 138 so that bottom 136 is a continuous, generally straight element of support member 132. It is understood, however, that bottom 136 of support member 132 may be constructed such that bottom 136 is discontinuous in whole or in part transversely between feet 138, such as where support member 132 is configured to be generally H-shaped, or generally A-shaped.

In one suitable embodiment, the support member 132 further comprises at least one locking component 142 at each foot 138 of support member 132. Locking component 142 is particularly one component of a suitable locking mechanism, with the locking component 142 being capable of locking engagement with a corresponding component of such a locking mechanism. For example, one suitable locking mechanism (having two components configured for locking engagement) is commonly referred to as a semi-automatic twist-lock locking mechanism, the construction and operation of which is known to those skilled in the art and therefore will not be further described herein except to the extent necessary to set forth the present embodiment. It is also understood that any suitable locking mechanisms other than a semi-automatic twist-lock locking mechanism may be used and remain with the scope of this invention. The support member 132 also has a second pair of locking components 142 at top 144 of support member 132, respectively aligned longitudinally with locking components 142 at bottom 136 of support member 132 to permit stacking of tower sections 124 on deck D as will become apparent.

Figure 6:
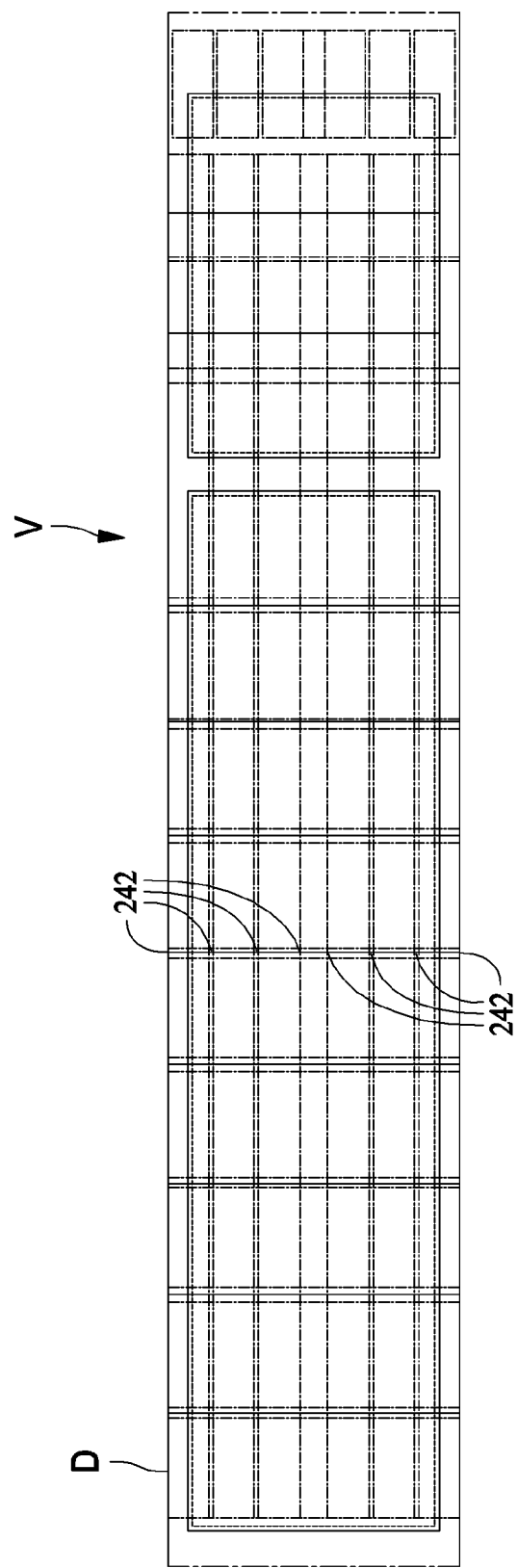
FIG. 6 is a top plan view of a weather deck of a shipping vessel without tower sections loaded thereon so as to reveal a locking component layout on the deck.

FIG. 6 is a schematic illustration of weather deck D of one shipping vessel V suitable for shipping tower sections 124 but without any tower sections 124 loaded thereon so that deck D is visible. Locking components 242 are secured to weather deck D at intermittent locations both across the width of the deck D and longitudinally along the deck D in a pattern. For example, the cross-deck spacing and longitudinal spacing of locking components 242 on weather deck D may typically correspond to a desired cargo container (not shown) loading arrangement. In the illustrated embodiment of FIG. 6, eight such locking components 242 are spaced across the width of deck D, although not evenly. In particular, one locking component 242 is located at and more suitably extending slightly outward from each of the opposite sides of deck D. Additional locking components 242 are located transversely inward from the sides of deck D in roughly equidistant spacing, with the exception that the two innermost locking components 242 are spaced closer to each other than remaining locking components 242.

It is understood that the deck D locking component 242 layout may vary for other shipping vessels V without departing from the scope of this invention. It is also contemplated that tower sections 124 (and more particularly support members 132 secured to such tower sections 124) may additionally, or alternatively, be mounted to other shipping vessel V structure, such as the floor of the cargo hold.

Figure 4:
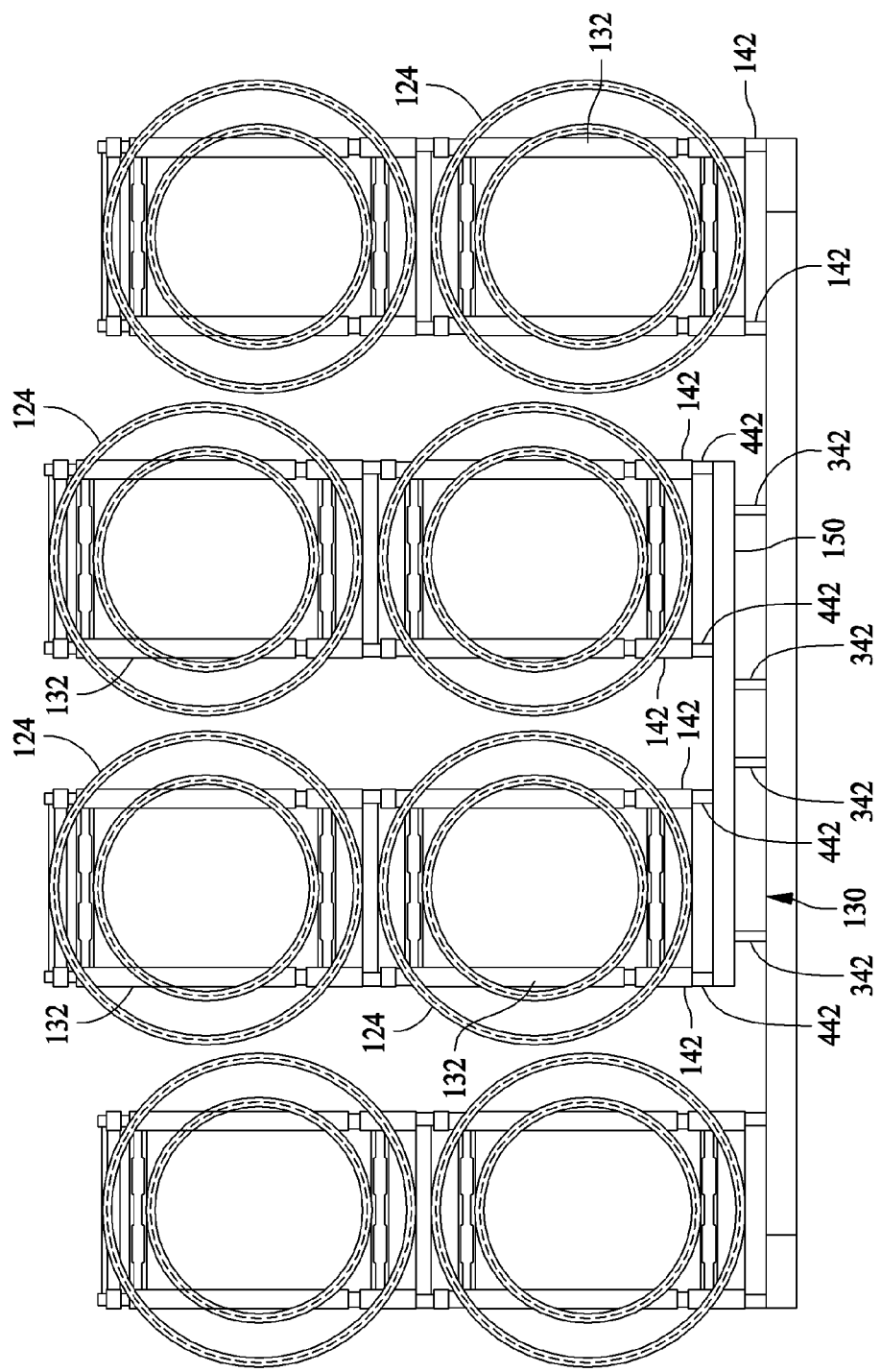
FIG. 4 is an end view of the multiple tower sections and mounting system of FIG. 3, with the portion of the vessel below the deck being omitted.

With particular reference now to FIG. 4, the spacing between locking components 142 on feet 138 of support members 132 generally corresponds to the cross-deck spacing between locking components 242 (shown in FIG. 6) of weather deck D with the exception of the innermost locking components 242. In accordance with one embodiment of a method of mounting tower sections 124 on a shipping vessel V one tower section 124 is mounted on deck D by engaging locking components 142 of support members 132 with an outermost pair of locking components 242 adjacent one side of deck D. A second tower section 124 is mounted on deck D by engaging locking components 142 of support members 132 with an outermost pair of locking components 242 adjacent the opposite side of deck D.

Because of the size (e.g., diameter) of tower sections 124, only one additional tower section 124 can be mounted cross-deck-wise directly on deck D in accordance with locking component 242 locations on deck D. However, there is sufficient room cross-deck-wise between the outermost mounted tower sections 124 to mount two additional tower sections 124—but locking components 142 of respective support members 132 secured to tower sections 124 cannot properly align with remaining locking components 242 of deck D.

Accordingly, mounting system 130 in one embodiment further comprises an elongate mounting member 150 configured to permit mounting an additional two tower sections 124 in side-by-side relationship on deck D between outermost mounted tower sections 124. Mounting member 150 is, in the illustrated embodiment, of a general beam construction such as an I-beam construction as illustrated in FIG. 5b. It is understood, however, that mounting member 150 may be of other beam-type constructions, a tubular bar, a solid bar or other suitable construction as long as it is capable of withstanding the weight of tower sections 124.

Figure 5A:
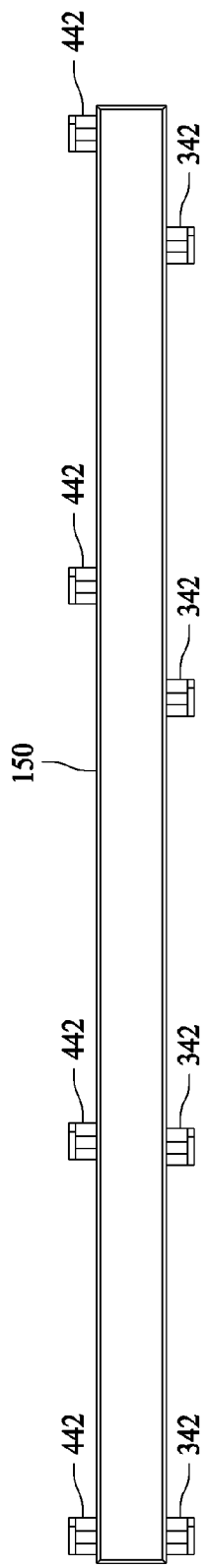
FIG. 5A is a top plan view of one embodiment of an elongate mounting member of the mounting system of FIG. 3.
Figure 5B:
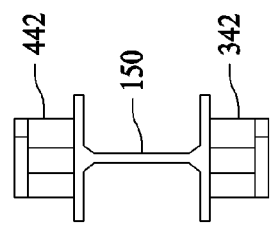
FIG. 5B is an end view thereof.

As best seen in FIG. 5A, a first set of locking components 342 is secured to mounting member 150 in spaced relationship with each other. In one particularly suitable embodiment, the spacing between locking components 342 of mounting member 150 corresponds to the spacing between the four innermost (e.g., the remaining) locking components 242 of weather deck D as illustrated in FIG. 4 to permit mounting member 150 to be releasably secured to deck D. It is contemplated that mounting member 150 may be releasably secured to deck D other than by locking components 342, such as by another suitable locking system or it may be more permanently secured to deck D.

A second set of locking components 442 is secured to mounting member 150 opposite first set of locking components 342. In particular, a first pair of these locking components 442, toward one end of mounting member 150, has a locking component spacing in accordance with the spacing between locking components 142 of support members 132. A second pair of these locking components 442, toward the opposite end of mounting member 150, also has a locking component spacing in accordance with the spacing between locking components 142 of support members 132. The spacing between first and second pairs of locking components 442 need not correspond to the spacing between locking components 142 of support members 132 but is rather determined generally as a function of the cross-sectional size (e.g., diameter) of tower sections 124 to be mounted on mounting member 150.

In the illustrated embodiment, elongate mounting member 150 has a length that is less than the width of deck D but otherwise sufficient to extend at both ends thereof at least up to and more suitably slightly beyond (cross-deck-wise) the outer ones of the four innermost locking components 242 of deck D. It is contemplated however that mounting member 150 may be of a length to extend across a greater width of deck D and in one embodiment it may extend across the full width of deck D. In such an embodiment (not shown) mounting member 150 may be secured to deck D by a first set of eight locking components 242 (one for each cross-deck locking component of deck D) of mounting member 150 and all four tower sections 124 (and more particularly support members 132 therefore) may be secured to a second set of eight locking components 242 of mounting member 150.

As illustrated in FIG. 3, multiple tower sections 124 may be transported on deck D of shipping vessel V by being arranged longitudinally along deck D. For example, in FIG. 3, four sets of tower sections 124—of different sizes—are loaded on deck D. To load the deck D in this manner, eight elongate mounting members similar to mounting member 150 are used.

With reference back to FIG. 4, because support members 132 secured to the ends of each tower section 124 include locking components 142 at both the tops 144 and bottoms 136 of support members 132, tower sections 124 can also be stacked, with locking components 142 at bottoms 136 of support members 132 of an upper tower section 124 releasably connecting to locking components 142 at tops 144 of support members 132 of a lower tower section 124 (i.e., the tower section 124 that is secured to weather deck D).

The need to weld support members to the vessel V is eliminated by using elongated mounting member 150 to releasably secure tower sections 124 to the shipping vessel. Mounting member 150 distributes the load of tower sections 124 along the deck based on the spacing of the mounting member 150, thereby distributing the load over a greater area of shipping vessel V.

In the illustrated embodiments, tower sections 124 are illustrated as being loaded onto weather deck D of a shipping vessel. It is contemplated that additionally, or alternatively, tower sections 124 may be loaded onto the floor of the cargo hold of shipping vessel V or other suitable support surface of shipping vessel V.

When introducing elements of the present invention or preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for transporting wind turbine tower sections on a waterborne shipping vessel, the shipping vessel having a plurality of locking components thereon, the system comprising:
   a support member securable to a wind turbine tower section, the support member having at least two locking components;
   a mounting member having a first set of locking components located on the mounting member that releasably connects with locking components of the shipping vessel to releasably secure the mounting member on the shipping vessel, and a second set of locking components located on the mounting member separate from the first set of locking components, the support member locking components capable of releasable connection with said second set of locking components of the mounting member to releasably secure the wind turbine tower section to the mounting member; and
   a second mounting member positioned adjacent to the mounting member in a cross-deck-wise relationship, the second mounting member for releasably securing a second wind turbine tower section with the locking components of the shipping vessel such that the second wind turbine tower section is in a cross-deck-wise relationship with the wind turbine tower section.

2. The system set forth in claim 1 wherein the support member is a first support member securable to the wind turbine tower section either at or adjacent one end of said section, the system further comprising a second support member securable to the wind turbine tower section either at or adjacent an opposite end of said section, the second support member having at least two locking components.

3. The system set forth in claim 1 wherein the mounting member is configured to releasably connect at least two wind turbine tower sections thereto.

4. The system set forth in claim 1 wherein at least one of 1) the locking components on the support member, 2) the first set of locking components on the mounting member and 3) the second set of locking components on the mounting member are semi-automatic twist-lock locking components.

5. The system set forth in claim 1 wherein the mounting member is generally of a beam construction.

6. The system set forth in claim 1 wherein the mounting member has a length, the first set of locking components being located along the length of the mounting member according to a first arrangement of the locking components on the mounting member, the second set of locking components being located along the length of the mounting member according to a second arrangement of the locking components on the mounting member, said second arrangement being different from the first arrangement.

7. The system set forth in claim 2 wherein the mounting member being a first elongate mounting member, the first support member locking components being capable of releasable connection with the second set of locking components of the mounting member, the system further comprising a second elongate mounting member having a first set of locking components located on the second mounting member for releasable connection with locking components of the shipping vessel to releasably secure the second mounting member on the shipping vessel at a location spaced from the first mounting member.

8. The system set forth in claim 2 wherein the mounting member has a second set of locking components located on the second mounting member separate from the first set of locking components, the second support member locking components being capable of releasable connection with said second set of locking components of the second mounting member.

9. A system for transporting at least a first wind turbine tower section and a second wind turbine tower section on a shipping vessel, the system comprising:
  a first support member securable to the first wind turbine tower section,
  a second support member separate from the first support member and securable to the second wind turbine tower section; and
  a first elongate mounting member securable to the shipping vessel, the first support member being securable to the first elongate mounting member;
  a second elongate mounting member securable to the shipping vessel, the second support member being securable to the second elongate mounting member, the first support member and the second support member in a generally side-by-side spaced relationship with each other such that the first wind turbine tower section and the second wind turbine tower section are arranged in a cross-deck-wise relationship.

10. The system set forth in claim 9 wherein the mounting member, the first support member and the second support member are configured such that when the first and second support members are secured to the mounting member said support members are free from direct contact with the shipping vessel.

11. The system set forth in claim 9 wherein the elongate mounting member has a set of locking components thereon, the first support member having at least one locking component thereon for releasable connection to at least one of the mounting member locking components, the second support member having at least one locking component thereof for releasable connection to at least one other of the mounting member locking components.

12. The system set forth in claim 11 wherein the mounting member locking components, the at least one locking component of the first support member and the at least one locking component of the second support member comprise semi-automatic twist-lock locking components.

13. The system set forth in claim 9 wherein the mounting member is adapted for releasable connection to the shipping vessel.

14. The system set forth in claim 9 wherein the elongate mounting member is generally of a beam construction.

15. A method of transporting wind turbine tower sections on a waterborne shipping vessel, the method comprising:
  securing a pair of support members to a first wind turbine tower section generally at opposite ends of said first tower section;
  securing another pair of support members to a second wind turbine tower section generally at opposite ends of said second tower section;
  securing a pair of elongate mounting members on a support surface of the shipping vessel in spaced relationship with each other; and
  securing one of said support members of said first tower section and one of said support members of said second tower section to one of said elongate mounting members and securing the other one of said support members of said first tower section and the other one of said support members of said second tower section to the other one of said elongate mounting members, such that the first wind turbine tower section and the second wind turbine tower section are arranged in a cross-deck-wise relationship.

16. The method set forth in claim 15 wherein the step of securing the support members of the first and second tower sections to the respective elongate mounting members comprises releasably securing the support members of the first and second tower sections to the respective elongate mounting members.

17. The method set forth in claim 15 wherein the step of securing a pair of elongate mounting members on a support surface of the shipping vessel comprises releasably securing said pair of elongate mounting members on said support surface of said shipping vessel.

18. The method set forth in claim 15 further comprising securing a third pair of support members to a third wind turbine tower section generally at opposite ends of said third tower section, and securing the support members of said third tower section to the support members of the first tower section with the third and first tower sections in a generally side-by-side stacked relationship with each other.

19. An adapter for securing at least a first wind turbine tower section and a second wind turbine tower section on a waterborne shipping vessel, said adapter comprising:

an elongate section configured to interlock with a deck mount; and a plurality of locking components that are adapted to connect the first and second wind turbine sections to said elongate section.

20. The adapter set forth in claim 19 wherein a first set of locking components is releasably secured to a vessel deck and a second set of locking components is opposite said first set of locking components.

21. The adapter set forth in claim 19 wherein said elongate section is adapted to fit a plurality of said locking components.

22. The system set forth in claim 19 wherein the elongate section is configured to releasably interlock with the deck mount.

\* \* \* \* \*